INVENTORS
FRANK G. SCHULZ
MARIO ANTONAZZI
BY Herbert L. Davis
ATTORNEY

INVENTORS
FRANK G. SCHULZ
MARIO ANTONAZZI

INVENTORS
FRANK G. SCHULZ
MARIO ANTONAZZI
BY Herbert L. Davis
ATTORNEY

INVENTORS
FRANK G. SCHULZ
MARIO ANTONAZZI

ATTORNEY

Feb. 16, 1971  F. G. SCHULZ ET AL  3,564,408

TEST DEVICE FOR AN ELECTRICAL CIRCUIT CARD

Filed Aug. 12, 1968  8 Sheets-Sheet 7

INVENTORS
FRANK G. SCHULZ
MARIO ANTONAZZI

BY *Herbert L. Davis*

ATTORNEY

INVENTORS
FRANK G. SCHULZ
MARIO ANTONAZZI

ATTORNEY

United States Patent Office 3,564,408
Patented Feb. 16, 1971

3,564,408
TEST DEVICE FOR AN ELECTRICAL CIRCUIT CARD
Frank G. Schulz, Rahway, and Mario Antonazzi, Oradell, N.J., assignors to The Bendix Corporation
Filed Aug. 12, 1968, Ser. No. 752,076
Int. Cl. G01r 15/12, 31/26
U.S. Cl. 324—158      26 Claims

ABSTRACT OF THE DISCLOSURE

A universal printed circuit card contact test fixture to mount many sizes and types of printed circuit cards for making simultaneous electrical contact to selected solder nodes and rivers thereon and which test fixture is adaptable for automatic fault isolation testing of the printed circuit cards to a discrete component level and is further adaptable to different types of cards with a minimal amount of new parts fabrication and set up time.

CROSS-REFERENCE TO RELATED APPLICATIONS

The present invention relates to an improved means of making electrical contact to selected points interior to the circuit of a printed circuit card under test with or without discrete electronic components installed so as to provide either quantitative or qualitative fault isolation production tests for such circuit cards as distinguished from merely effecting continuity testing of the solder paths of a printed circuit card without components installed by the provision of a roller assembly of a type such as disclosed and claimed in a copending U.S. application Ser. No. 633,336 filed Aug. 25, 1967, by Donald C. Becknell, now U.S. Pat. No. 3,501,698, granted Mar. 17, 1970, and assigned to The Bendix Corporation, assignee of the present invention.

There may be embodied in the test fixture of the present invention a platen and patch board assembly 1 described herein with reference to FIG. 6 and of a type such as described and claimed in a copending U.S. application Ser. No. 749,092, filed July 31, 1968 by Frank G. Schulz and Mario Antonazzi, while the assembly of the electrical contact means 22 described herein with reference to FIG. 6 is the subject matter of a copending U.S. application Ser. No. 48,647, filed May 13, 1970, by Frank G. Schulz and Mario Antonazzi as a division of the U.S. application Ser. No. 749,092, and both of said applications have been assigned to The Bendix Corporation, assignee of the present invention.

BACKGROUND OF THE INVENTION

Field of the invention

The invention is in the field of inspection and testing of printed circuit cards and is specifically directed to the provision of a test fixture providing a means for making electrical contact to selected points interior to the circuit of the card under test to conduct electrical tests and measurements of components carried by the card, as well as identification of faults such as open or shorted rivers of electrical conductors in a layer or several layers of a multilayer printed circuit card by electrical tests together with verification of the continuity or the discontinuity of the several circuit elements at the layer or multilayers of the circuit card by the making of electrical contact to selected points of the circuit card.

Description of the prior art

Heretofore, among the problems encountered in providing for fault isolation production test equipment for many types of printed circuit cards has resided in the necessity of providing a means of making electrical contact to selected points interior to the circuit of the printed circuit card under test. More specifically, the following problems must be considered in providing a universal contact test fixture for printed circuit cards;

(1) The dimensions of various types of printed circuit cards will differ both in length and width.

(2) The printed circuit cards may require that the edges of the cards be utilized for guiding and locating the cards in relation to the test equipment.

(3) The physical location and geometry of solder nodes and rivers will be found to vary among the different types of printed circuit cards.

(4) Further it will be found that in different types of printed circuit cards there is an irregularity in the solder node plane to which the selective electrical contact must be made to effectuate the required isolation tests.

(5) The printed circuit cards may be found to have extractors, connectors or other edge protrusions which may interfere with the mounting of the cards in relation to the test equipment.

(6) The printed circuit cards may be found to bow when subjected to even moderate loading pressures in effectuating the desired circuit tests.

Generally in the past each type of printed circuit card would require a special contact fixture for conducting tests on that particular type of circuit card, resulting in substantial design and fabrication cost and lengthy test equipment implementation time.

Current automated test equipment enables functional test of electronic modules, printed circuit cards, at rates 10–20 modules per hour. Defective modules identified by such automatic equipment must be reworked in a time consuming process involving diagnosis and component substitution usually done on a manual basis.

Some work has been done in the development of circuit analysis and diagnostic computer programs which attempt to identify special component failures based upon the data obtained in functional test. However, current programs are limited in the number and type of components allowed, require a substantial investment in programming for a particular module type and are handicapped by a lack of suitable output data on the internal functions of the module.

Another approach treats the module as an "N Port" network, where N is the number of circuit nodes, and performs impedance measurements across all or selected combinations of nodes. The measurements obtained are compared to data taken on a known "Good" module to identify the specific defective component(s).

A relatively expensive fixture must be developed for each module type to gain access to the various nodes and if the number of circuit nodes is large the number of measurements required becomes excessive.

A number of probe devices have been heretofore utilized to sense faults in printed circuit cards, as shown in U.S. Pat. No. 2,887,622, granted May 19, 1959, to Charles C. Rayburn and Robert L. Henry and in a U.S. Pat. No. 3,137,815, granted June 16, 1964, to Richard D. Hershey, to test for continuity of electrical or electronic circuitry. While a U.S. Pat. No. 3,016,489, granted Jan. 9, 1962, to Thomas H. Briggs and Edwin A. Hollenbach discloses a circuit card test holder with guides adapted to be adjustable longitudinally and transversely to accommodate different size cards under test.

Also U.S. Pat. No. 3,184,700, granted May 18, 1965, to Arthur J. Burke and John W. Aquadro and a U.S. Pat. No. 3,335,386, granted Aug. 8, 1967, to Orland E. Upton discloses examples of locking mechanisms for retaining a circuit card in the frame for testing purposes, while a U.S. Pat. No. 3,052,842, granted Sept. 4, 1962, to Robert Frohman, Ralph A. Post, Jr., and Lawrence P. Faber, Jr., and a U.S. Pat. No. 3,375,408, granted Mar. 26, 1968, to Frederick G. Buhrendor and Oskar Loosme have also been noted of interest in showing electrical connections for test board assemblies.

The prior disclosures and references have failed to suggest the concept of the present invention in the idea of means herein provided for utilization in effecting a universal test fixture, including a printed circuit card contact test fixture assembly which is adjustable both in a lateral and in a longitudinal sense relative to contact probes carried by a platen-patch board assembly. The arrangement is such that printed circuit cards of any size or type, within the range of adjustment of the test fixture, may be mounted and tested in a test fixture assembly which permits rapid changeover to different types of printed circuit cards with a minimum amount of new parts fabrication in that only an interchangeable platen of the platen-patch board assembly in the present invention need be changed to effectuate tests.

SUMMARY OF THE INVENTION

The invention contemplates a test device for a single or multilayer printed circuit card including contact probe means to effect discrete electrical contact with conductive terminals of the printed circuit card so as to effect quantitative and qualitative measurements of the circuitry, as well as such tests and measurements of electrical components that may be carried by the card as may be deemed necessary, including measurements across resistor elements, polarity of diodes and the operation of each electrical component, together with tests of the electrical tolerances thereof.

An object of the invention is to provide an automatic in-circuit component tester for electronic modules.

Another object of the present invention is to provide at universal test fixture including a means for carrying a printed circuit card of varying size or type and which is adjustable in a lateral and longitudinal sense relative to contact probes carried by a platen-patch board assembly for effecting electrical tests on the printed card.

Another object of the invention is to provide such a test fixture allowing cantilevered mounting of the printed circuit card so arranged as to provide clearance for card extractors, connectors or other edge protrusions, as well as electrical components carried by the card.

Another object of the invention is to provide a test fixture for a printed circuit card in which the printed circuit card under test may be readily located in the test fixture by the edges of the card.

Another object of the invention is to provide a universal printed circuit card contact test fixture including means for effecting electrical contact to selected nodes of the printed circuit card under test and in which there is provided great flexibility of operation through the provision of an interchangeable platen or platen-patch board assembly comprised of a matrix of spring loaded pressure pins inserted into the platen and the patch board and which spring loaded pressure pins provide a means for making electrical contact in one sense with the selected nodes of the printed circuit card under test, as well as in another sense with the electrical equipment to conduct the tests.

Another object of the invention is to provide a platen-patch board assembly in such a test fixture in which a portion of the test programming may be effectively accomplished in the platen-patch board assembly thereby reducing the amount of programming required in the ancillary electrical switching or scanning devices.

Another object of the invention is to provide means whereby selective testing of portions of the printed circuit card may be achieved by utilization of a platen, or master board, which may be readily manufactured by use of the same production equipment, template or techniques required to produce the card so that holes formed in the platen, or master board, for mounting the contact probe means in the platen may in effect be identically located to holes formed in the card for solder nodes of the printed circuit card, so that except for the thickness of the platen and the diameter of the node holes the platen will correspond to the particular printed circuit card to be tested thereon.

Another object of the invention is to provide an adjustable backup board to support the printed circuit card under test and to prevent a bowing of the card as it is pressed against the pressure pin matrix of the platen in the aforenoted test fixture.

A further object of the invention is to provide a universal printed circuit card contact test fixture so arranged as to permit rapid changeover to different type card testing with a minimal amount of new parts fabrication in that only the platen component of the platen-patch board assembly need be replaced or refabricated to meet the requirements of each different printed circuit card submitted for testing.

These and other objects and advantages of the invention are pointed out in the following description in terms of the embodiment thereof which is shown in the accompanying drawings.

DESCRIPTION OF THE DRAWINGS

Referring to the drawings in which corresponding numerals indicate corresponding parts in the several views.

DESCRIPTION OF THE INVENTION

Figure 2:
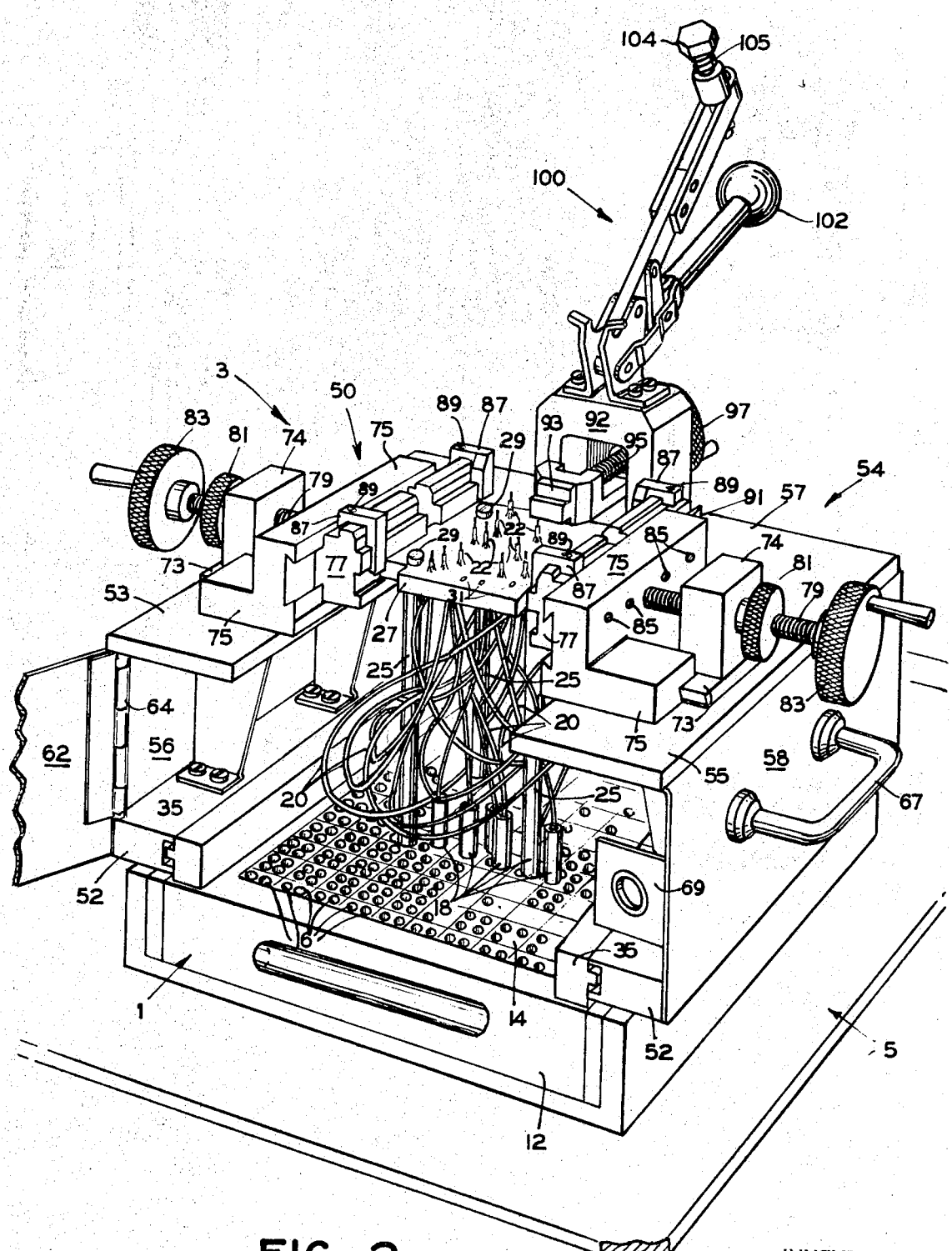
FIG. 2 is an end perspective view of the universal printed circuit contact test fixture of FIG. 1 with the door of the assembly open showing the platen-patch board assembly and the matrix of contact pins projecting through the platen with the printed circuit card to be placed under test removed.
Figure 3:
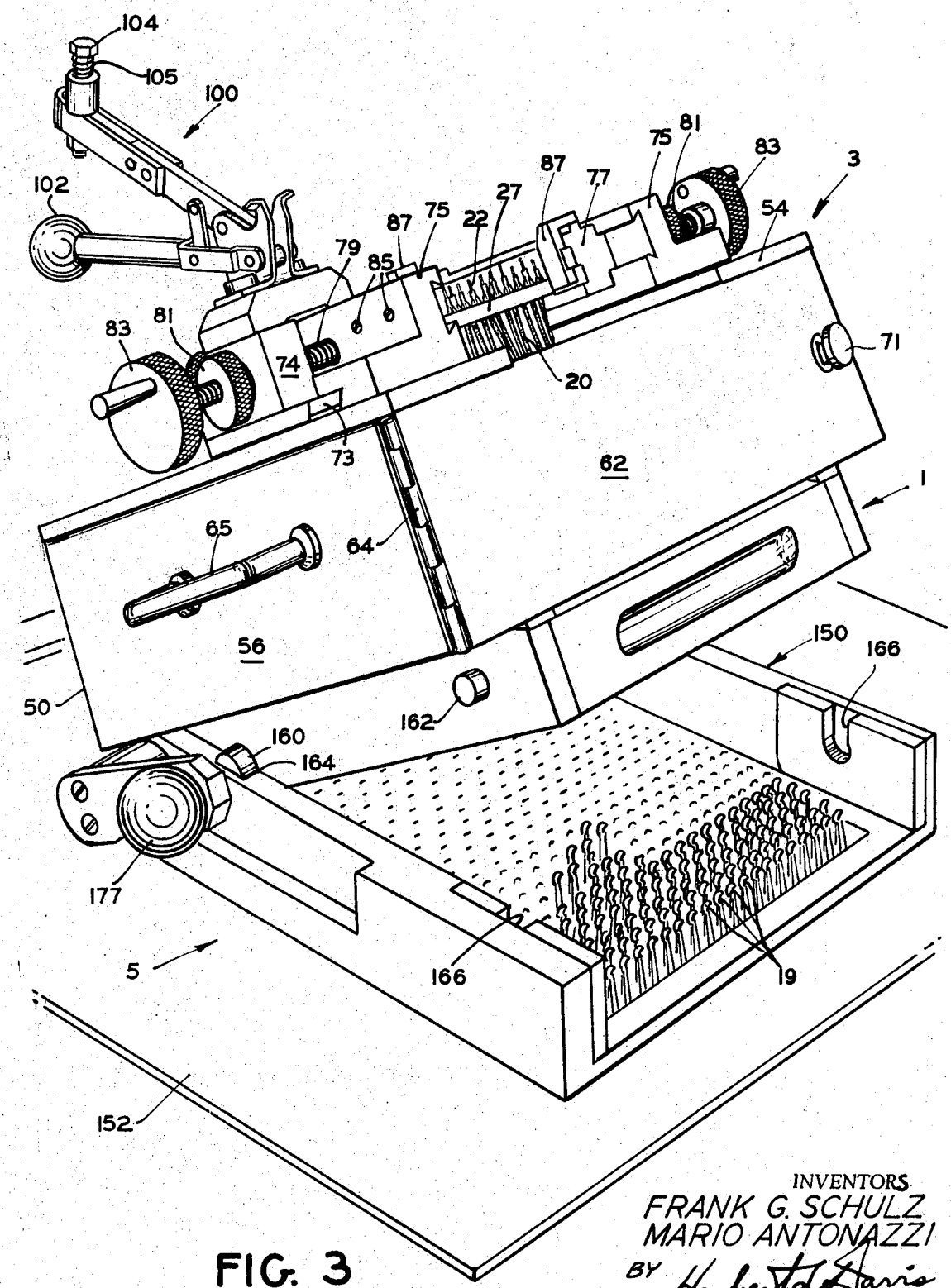
FIG. 3 is a side perspective view of the test fixture of FIG. 2 illustrating the platen-patch board assembly angularly positioned out of a locking relation with a receiver panel.
Figure 4:
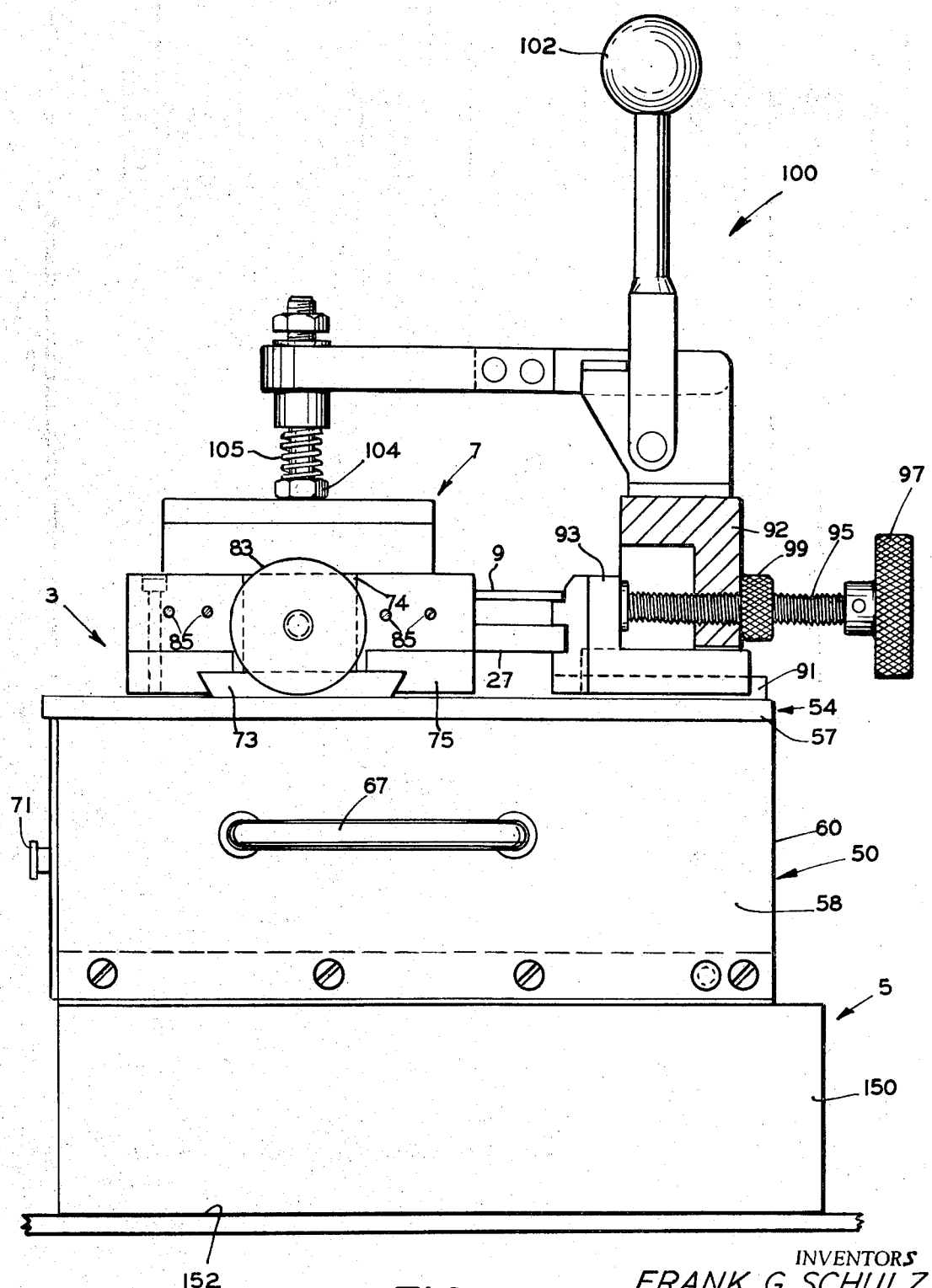
FIG. 4 is a detailed side view of the test fixture of FIG. 1 with the operating lever in an engaging relation for pressing the printed circuit card into contact engaging relation with the several contact pins of the platen-patch board assembly.
Figure 5:
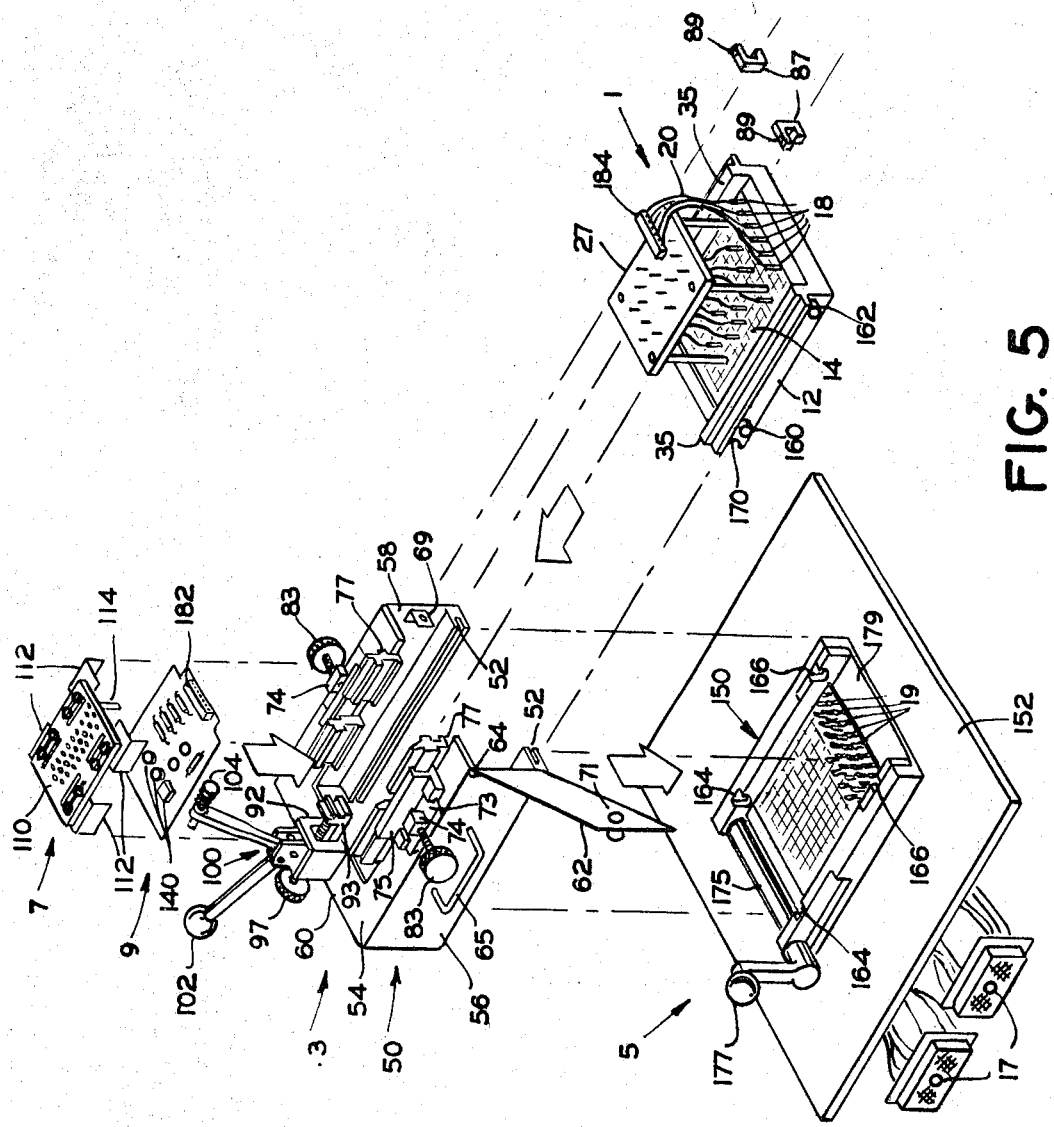
FIG. 5 is an exploded schematic view of the several operating parts of the universal printed circuit card contact test fixture embodying the present invention.

The universal printed circuit card contact test fixture of the present invention is shown schematically by FIG. 5 as composed of four major assemblies, including the platen-patch board assembly 1, as shown in detail by FIG. 6; a printed circuit card contact fixture assembly 3, as shown in detail in FIGS. 1, 2, 3 and 4, and into which fixture assembly 3 the platen-patch board assembly 1 is slidably mounted, as hereinafter explained; a receiver panel assembly 5, as shown in FIG. 3, and into which the platen-patch board assembly 1 may be releasably locked by means of suitable slots and a manually operable cam shaft, as indicated by the arrows of FIG. 5 and hereinafter explained in greater detail; and a printed circuit card backup board assembly 7, as shown in detail by FIGS. 7 and 11. In the schematic diagram of FIG. 5, a typical printed circuit card to be placed under test has been indicated by the numeral 9, while another type of printed circuit card which may be tested in the test fixture is shown in detail by FIGS. 12. In FIG. 7, the irregular surfaces of nodes 10 of electrical circuitry of the circuit card 9 are shown in contact engaging relation with end surfaces of a matrix of spring biased contact pressure pins 22.

PLATEN-PATCH BOARD ASSEMBLY

Figure 6:
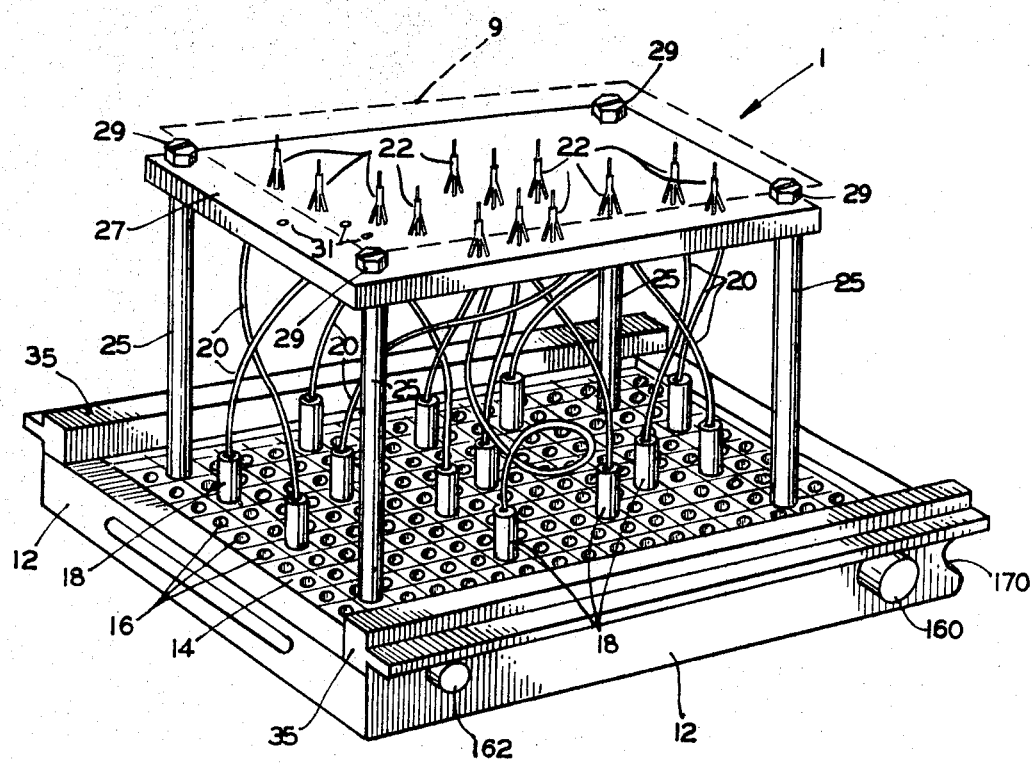
FIG. 6 is a perspective view of the platen-patch board assembly embodied in the test fixture of FIGS. 1 and 5.
Figure 8:
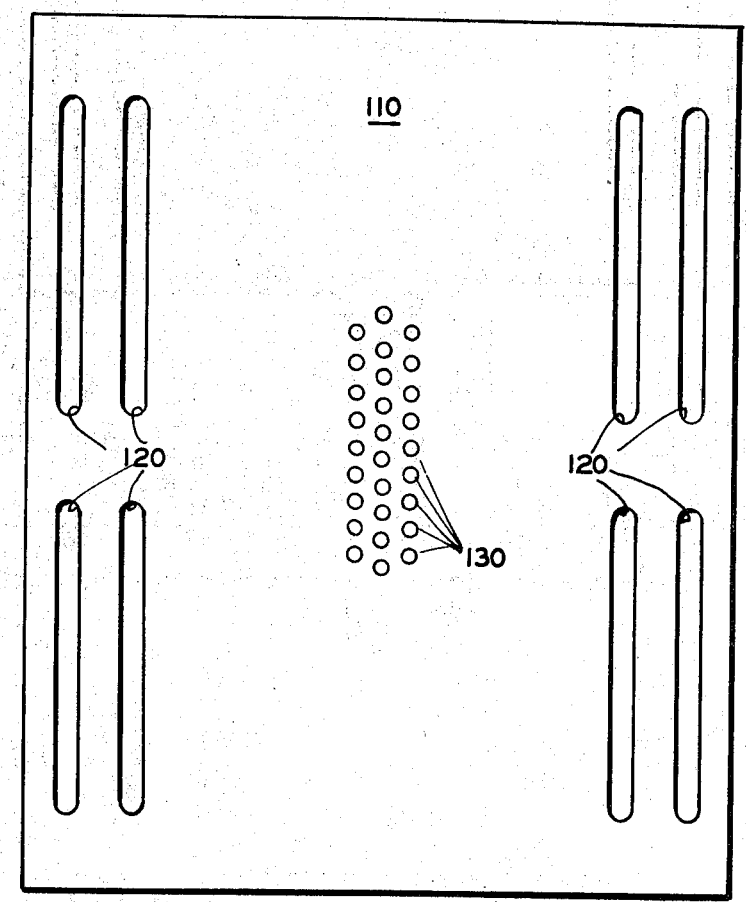
FIG. 8 is a top plan view of the backup board which may be utilized in the assembly of FIG. 7.
Figure 7:
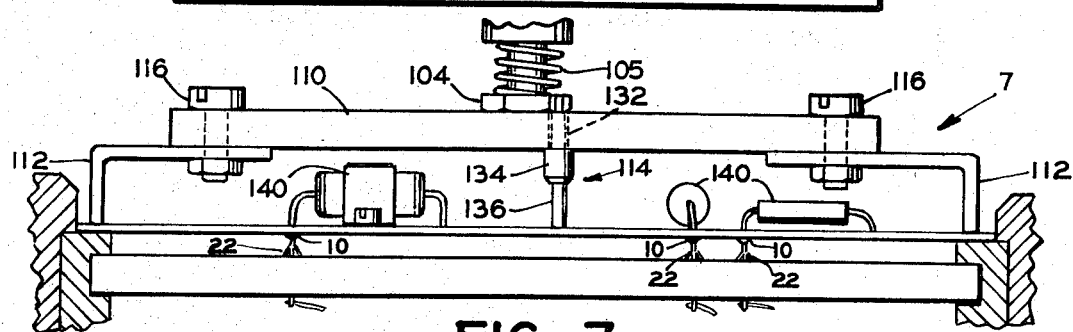
FIG. 7 is a side detail view of the backup board assembly showing the pressure stud and brackets in an operative relation with a printed circuit card having component parts of the circuit affixed to the printed circuit card.

Referring now to FIGS. 2 and 6, a platen-patch board assembly is indicated generally by the numeral 1 and includes a rectangular shaped box 12 having mounted therein a patch board 14 of conventional type including a multitude of grid holes 16. Each of these grid holes 16 serve to releasably receive therein an electrical patch board plug connector 18. Each of the patch board plug connectors 18 may be of a conventional type and includes a body portion which protrudes through the patch board 14 so as to make electrical connection with suitable electrical connectors or prongs 19 of the panel receiver assembly 5, as shown by FIGS. 3 and 5, for electrical connection to selected pins of interface connectors 17 and thereby to a test apparatus, not shown, as explained in the copending U.S. application Ser. No. 749,092, filed July 31, 1968, by Frank G. Schulz and Mario Antonazzi, assigned to The Bendix Corporation, assignee of the present invention.

Further, each of the patch board plugs 18 has electrically connected thereto one end of a resilient electrical conductor patch cord 20 which is electrically connected at the opposite end to a "poke home" pressure pin assembly 22. The pressure pin assembly 22 is carried in a pressure pin mounting hole 31 provided in a platen 27 which is formed of a suitable electrical insulating material.

Moreover, as shown by FIG. 6, there are provided four electrically insulated supporting posts 25 positioned in spaced relation and each having mounted at a lower end thereof a mounting plug to be received in a selected mounting hole 16 of the patch board 14. Opposite upper ends of the supporting posts 25 are positioned in holes provided in a platen or master board 27 and secured therein by suitable releasable fastening screws 29. The platen 27 is formed of a suitable electrical insulating material and is supported by the posts 25 in a position corresponding approximately to the center of the patch board 14.

The platen 27 has formed therein a pattern of pressure pin mounting holes 31 which are of an identical pattern and location to that of the holes formed in the printed circuit card 9 for receiving the solder nodes of such printed circuit card. The formation in the platen 27 of the pressure pin mounting holes 31 may be made from the same equipment, template or techniques required to produce the pattern of solder holes in the printed circuit card 9 so as to accurately locate the spring biased contact pressure pins 22 in corresponding relation to the solder nodes 10 of the printed circuit card 9 subject to test in the fixture 3.

A number of the "poke home" pressure pins 22 are inserted into the respective mounting holes 31 of the platen 27, while a patch board plug 18 in each instance is positioned in a selective grid hole 16 of the patch board 14 so as to effect a predetermined electrical connection through the panel receiver assembly 5 and interface connectors 17 to an electrical test apparatus of suitable type. The pressure pins 22 in the platen 27 may be of a type including spring biased contact pressure pins such as heretofore described and claimed in the aforenoted U.S. application Ser. No. 48,647 filed May 13, 1970 as a division of the U.S. application Ser. No. 749,092, filed July 31, 1968, by Frank G. Schulz and Mario Antonazzi.

Figure 1:
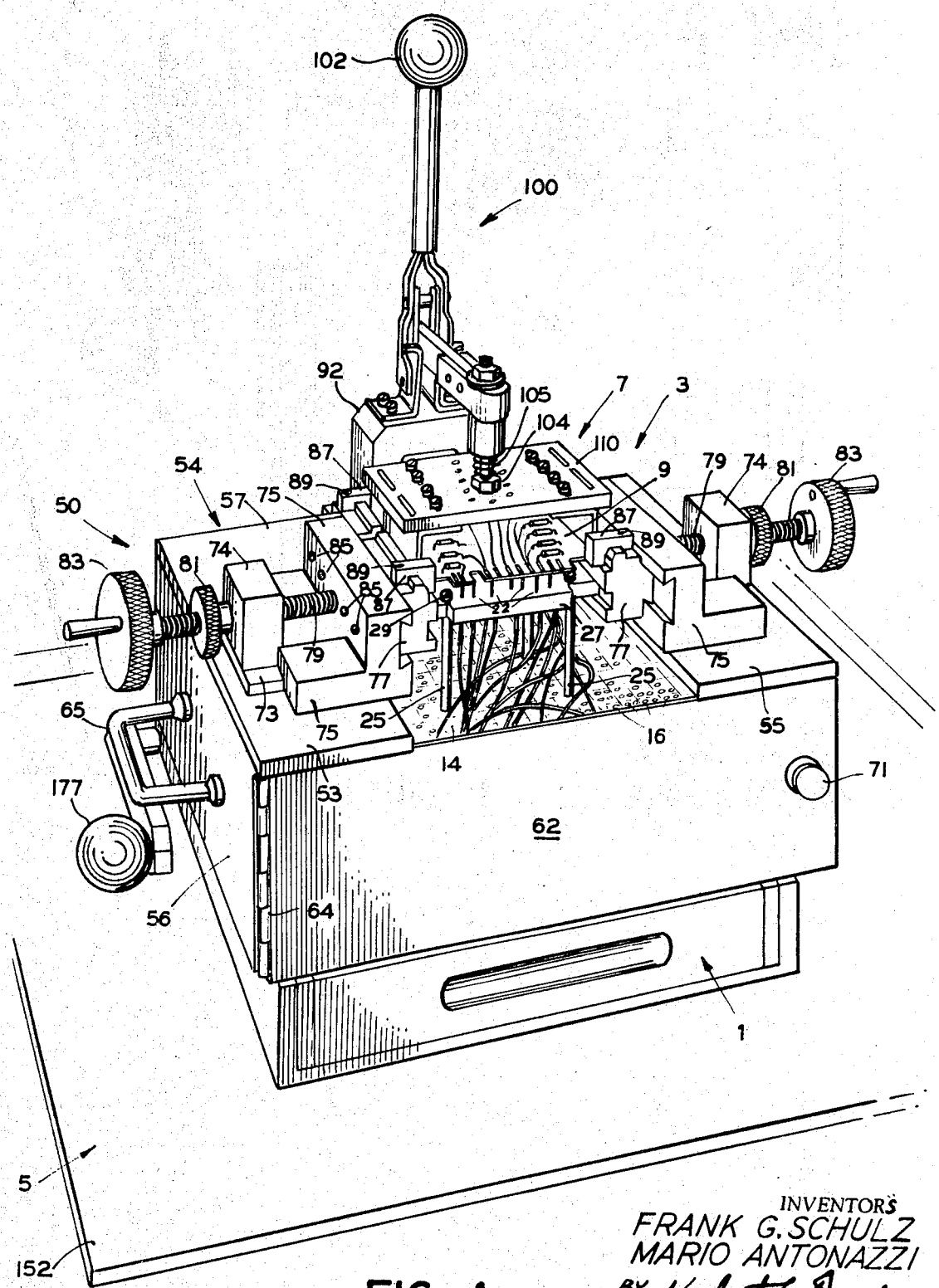
FIG. 1 is a perspective end view of a universal printed circuit card contact test fixture embodying the present invention and shown in an operative assembled relation with a printed circuit card subject to test.

Further, rails 35 are suitably fastened at upper side edges of the patch board 12 in spaced relation so that the platen-patch board assembly 1 may be assembled in the universal printed circuit card contact test fixture 3, as shown by FIGS. 1, 2, 3, 4 and 5. As indicated by the dash lines of FIG. 5, the test fixture 3, as shown in FIGS. 1, 2 and 5, is arranged to support a printed circuit card 9 under test in operative relation to the contact probes or spring biased "poke home" pressure pins 22.

Electrical continuity is then made between the plurality of pressure pins 22 inserted in the platen 27 and the nodes 10 and rivers of the printed circuit card 9 under test as selectively contacted by the pressure pins 22. Moreover, through the respective patch board plugs 18 positioned in selected grid holes 16 of the patch board 14 and electrically connected through the patch board cords 20 to the pressure pins 22 and through the electrical connector prongs 19 of the panel receiver assembly 21 to the test equipment, selected points interior to the printed circuit card 9 under test may be subject to both quantitative, as well as qualitative, fault isolation production tests provided by the test equipment electrically connected through the interface connectors 17 to the panel receiver assembly 5 and the connector prongs 19 thereof.

The use of the easily installed and removable platen 27 of the platen-patch board assembly 1, provides a platen or master board 27 which may be accurately formed so as to cause the pressure pin mounting holes 31 therein to correspond identically in position with the solder node holes of the printed circuit card 9 under test, by utilization of the same equipment, template or techniques to form both.

The platen 27 may be readily programmed then with the pressure pins 22 inserted through the mounting holes 31 into contacting relation with the solder nodes 10 positioned in corresponding relation thereto on the printed circuit card 9 under test. Further through the provision of the combination of the platen 27 and pressure pins 22, together with the patch board plugs 18 inserted through the patch board 14 so as to make predetermined connections with the test equipment through the panel assembly receiver 5, there is provided a unique platen-patch board assembly 1 which facilitates rapid change to new card testing with a minimal amount of new part fabrication.

The platen 27 may be readily replaced by removing the fastening screws 29 and a second platen 27 substituted for the original platen 27 or the entire platen-patch board assembly 1 with all the spring biased pressure pins 22 intact may be removed and a second platen-patch board assembly with the different programmed platen 27 and spring biased pressure pins 22 substituted therefor. Thus in order to meet the requirements for testing a printed circuit card 9 of a different type, it would be necessary merely to fabricate a second platen-patch board assembly 1 or platen 27 with a pattern of mounting holes 31 so positioned as to cause the spring biased pressure pins 22 mounted therein to correspond to the node pattern of the different printed circuit card 9 and to program the patch board plugs 18 in the selected grid holes 16 of the patch board 14 so as to effect predetermined connections with the test equipment through the panel assembly receiver 5 to provide the desired tests to be made on the different type circuit card 9.

Moreover, through a novel locking means, the spring biased pressure pins 22 are retained in the mounting holes 31 against inadvertent displacement which might otherwise result from the contacting pressures applied thereto by the printed circuit card under test. The pressure pins 22 are normally releasable from a locked relation in the mounting holes 31 of the platen 27 only through an operator-operative supplemental retraction tool, as illustrated and explained in the copending U.S. application Ser. No. 48,647 filed May 13, 1970, as a division of the U.S. application Ser. No. 749,092, filed July 31, 1968, by Frank G. Schulz and Mario Antonazzi.

A feature of the platen-patch board assembly 1, as described and claimed in the last mentioned U.S. application for patent, resides in an operational flexibility in providing means for effecting electrical contact with selected nodes 10 of the printed circuit card 9 under test, through the provision of an interchangeable platen 27 or platen-patch board assembly 1 including a matrix or spring loaded pressure pins 22 inserted in mounting holes 31 in the platen 27 and positioned in corresponding relation to the nodes 10 of the printed circuit card 9 which is to be subject to the test.

PRINTED CIRCUIT CARD CONTACT FIXTURE ASSEMBLY

The printed circuit card contact fixture assembly 3, as shown by FIGS. 2 and 5, includes a supporting structural frame 50 carrying a pair of slide blocks 52 for slidably receiving the pair of tracks 35 fastened at the upper side edge of the patch board box 12. A suitable detent plunger, not shown, may be provided in one or both of the slide blocks 52 for releasably locking the platen-patch board assembly 1 and the tracks 35 thereof in position in the printed circuit card contact fixture assembly 3.

A supporting structural frame 50 further includes a U-shaped top plate 54 having leg portions 53 and 55 interconnected by a portion 57 and downwardly extending side plates 56 and 58 with a back plate 60 extending at right angles thereto so as to enclose three sides of the fixture while a fourth front open side may be closed by a door 62 fastened by a hinge 64 to the side plate 56. Also affixed to the side plates 56 and 58, respectively, are handles 65 and 67 while mounted on an inner side surface of the side plate 58 is a bracket 69 having an aperture therein arranged to cooperate in a releasable locking relation with a latching element 71 mounted on the door 62 and which may be of a conventional type.

Referring to FIG. 1, it may be seen that the leg portions 53 and 55 of the top plate 54 mount two dove tail rail elements 73, each having affixed thereto a block 74 and being arranged to guide a cross slide member 75 carrying segmented card guide blocks 77. Cross slide member 75 is adjustably positioned in relation to the block 74 by a lead screw 79 which is screw threadedly engaged in the block 74 and at an inner end captures the cross slide member 75. The lead screw 79 may be angularly adjusted by an adjustment knob 83 and locked in an adjusted position by a lock nut 81. Angular adjustment of the knob 83 causes a lateral adjustment in the position of the cross slide member 75 so as to provide a means for effecting a lateral size adjustment of the segmented guide blocks 77 relative to the side surfaces of the printed circuit card 9 under test. The guide blocks 77 are provided in segments which ride in a dove tail slot of the cross slide member 75 and are locked in an adjusted position by set screws 85.

Tabs 87 slide along the card guide blocks 77 and are arranged to be locked thereon by set screws 89 so as to determine the linear adjusted position of the printed circuit card 9 in relation to the laterally adjusted segmented card guide blocks 77.

Referring to the drawings of FIGS. 1, 4 and 5, there is mounted on the portion 57 of the top plate 54 extending at right angles to the back side plate 60, a dove tail rail element 91 having a fixed block portion 92 arranged to guide a longitudinally movable guide member 93 which is adjustably positioned by a lead screw 95.

The lead screw 95 is screw threadedly engaged in the block 92 of the dove tail rail element 91 and at an inner end captures the guide member 93. The lead screw 95 may be angularly adjusted by an adjustment knob 97 and locked in the adjusted position by a lock nut 99. Angular adjustment of the knob 97 causes a longitudinal adjustment of the position of the movable guide member 93 for effecting a longitudinal size adjustment of the guide member 93 relative to the end surface of the printed circuit card 9 under test.

Further, there is pivotally mounted on the fixed block portion 92, a toggle clamping mechanism indicated generally by the numeral 100 and which includes a manually operable lever 102 and suitable interconnecting linkage which when actuated positions a plunger 104 against the biasing force of a spring 105 so as to clamp the backup board assembly 7, as shown in FIGS. 1 and 4, and thereby the printed circuit card 9 into a contacting relation between the solder nodes 10 of the circuit card 9 and the matrix of spring biased pressure pins 22, as shown by FIG. 7.

BACKUP BOARD ASSEMBLY

Figure 9:
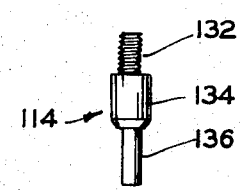
FIG. 9 is a detailed view of a pressure stud such as may be utilized with the backup board of FIG. 8 as shown in the assembly view of FIG. 7.
Figure 10:
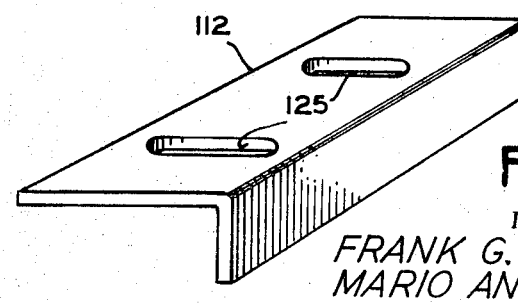
FIG. 10 is a detailed view of one of the angle rail elements that may be utilized with the backup board assembly of FIG. 7.
Figure 11:
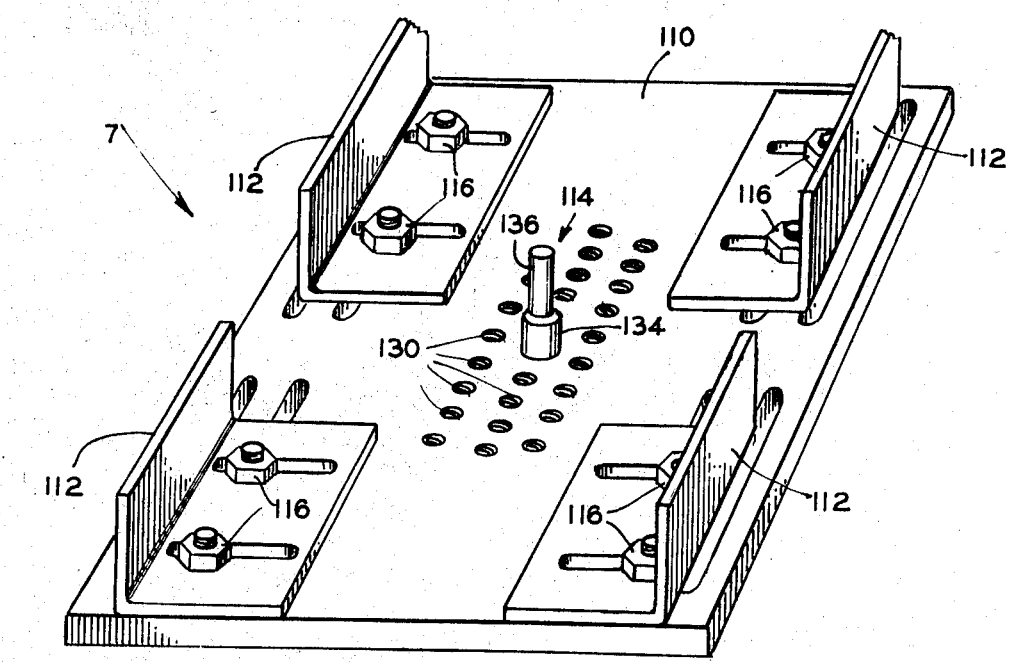
FIG. 11 is an inverted perspective view of the backup board of FIG. 7 illustrating the operative arrangement of the angle rails and the thrust stud.
Figure 12:
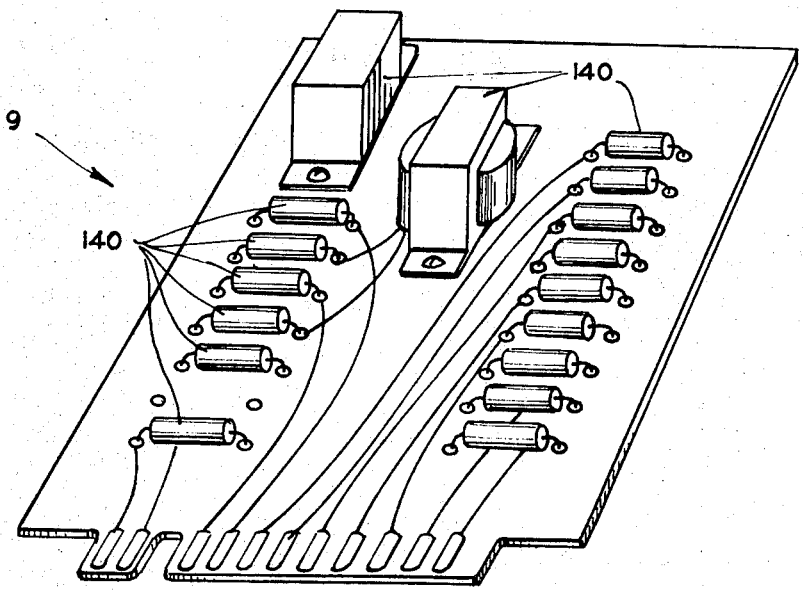
FIG. 12 is a perspective view of a typical printed circuit card of a type that may be subject to test in the test fixture of the present invention.

The backup board assembly 7, as shown by FIGS. 1, 5, 7 and 11, is composed of the following elements which may be furnished in various sizes to meet varying printed circuit card dimensions; a support plate 110; four angle rail elements 112, shown in detail by FIG. 10 and FIG. 11; a pressure stud 114, shown in detail by FIG. 9; and the associated mounting screws and nuts 116 for the rail elements 112. The support plate 110 includes four pairs of longitudinal slots 120 for adjustably receiving the mounting screws 116 for the four angle rail elements 112. Each pair of slots 120 provides a track in which the mounting screws 116 for the angle rail element 112 may be mounted so as to allow a longitudinal position adjustment of the angle rail element 112 on the plate 110. Likewise, each rail element 112 includes a pair of slots 125 in which the mounting screws 116 for the angle rail 112 may be mounted so as to allow a lateral position adjustment of the angle rail element 112 on the plate 110. The support plate 110 also includes a pattern of tapped holes 130 into which there may be selectively threaded a screw threaded portion 132 of the stud 114 and which projects from one end of a body portion 134, while a stem portion 136 projects from an opposite end of the body portion 134.

The arrangement of the backup board assembly 7 is such that the angle rail elements 112 may be adjusted to fit the edges of the printed circuit card 9 under test and the stud or studs 114 so positioned that the stem portion 136 thereof may contact a card 9 in an area or areas clear of component parts carried thereby, such as the component parts indicated in the drawings of FIG. 7 by the numerals 140. Thus as the printed circuit card 9 under test is pressed by the backup board assembly 7 against the pressure pin matrix 22 under the force applied through the action of the toggle clamping mechanism 100 and biasing spring 105 on the plunger 104 and thereby to the backup board assembly 7, the side of the card 9 carrying the component parts 140 will be supported along two edges by the angle rail elements 112 and at one or more interior points by the stud or studs 114.

RECEIVER PANEL

A receiver panel 5 as shown by FIGS. 3 and 5 includes a rectangular shaped patch board receiver box 150 mounted on a panel 152 by suitable brackets, not shown, and including in the receiver box 150 suitable electrical prongs 19 to selectively contact end portions of the patch board plugs 18 projecting through the patch board assembly 14. The electrical prongs 19 are electrically connected to pins of the interface connectors 17 and thereby to suitable test apparatus for conducting the test on the circuit card 9.

Projecting from opposite side surfaces of the box 12 at opposite end portions thereof are locking plugs 160 and 162 arranged to be received in cam slots 164 and 166, respectively, formed in inner surfaces of opposite sides of the receiver box 150, as shown by FIGS. 3 and 5.

Further formed in a back side surface of the patch board box 12 is a semicircular groove 170 arranged to receive an eccentric annular cam roller 175 rotatably mounted between the opposite sides of the receiver box 150 and angularly positioned by a manually operable lever or operator-operative means 177 so that the eccentric annular cam roller 175 is positioned in the semicircular groove 170. Thereupon with the locking elements 160 and 162 positioned in the respective cam slots 164 and 166, the patch board box 12 may be linearly actuated by the angular positioning of the cam roller 175 towards a forward open end 179 of the receiver box 150 with the locking pins 160 and 162 being then actuated into locking relation in the respective cam slots 164 and 166. The respective electrical prongs 19 connected to the test apparatus through the pins of the interface connectors 17 will then selectively make electrical contact with the respective end portions of the patch board plugs 18 projecting through the patch board 14 to in turn connect through the patch board cards 20 and the pressure pins 22 the several solder nodes 10 of the printed circuit card 9 and thereby place the circuitry thereof and the component parts carried by the card 9 under the tests provided by the test apparatus.

However, in order to lift the patch board box 12 out of operative relation with the several contact prongs 19, the manually operable lever 177 must be first positioned, as shown in FIG. 3, so that the cam roller 175, shown in FIG. 5, is positioned out of locking relation with the semicircular groove 170 in the back side surface of the patch board box 12, whereupon the operator may then force the patch board box 12 linearly back toward the roller cam 175 and lift the box 12 by means of the handles 65 and 67 angularly out of the receiver box 150, as shown in FIG. 3, so that the locking pins 160 and 162 thereupon move out of locking relation with the respective locking slots 164 and 166 provided in the inner side surfaces of the receiver box 150.

OPERATION

The operation and usage of the universal printed circuit card contact test fixture is shown schematically in FIG. 5. In order to set up the fixture to test a particular type printed circuit card 9, the following steps may be performed. The platen 27 is fabricated using the same equipment, template, or techniques required to produce the car 9, as heretofore explained. The platen-patch board assembly 1 is then assembled and programmed with the pressure pins 22, patch cords 20 and patch board plugs 18 so as to connect the same through the prongs 19 and the pins of the interface connectors 17 to a suitable apparatus for conducting the tests. Should the card 9 under test include a connector 182, as shown by FIG. 5, a suitable mating plug 184 is also provided for connection to the connector 182 of the card 9, and through the patch cords 20 and plugs 18 to the prongs 19 and pins of the interface connectors 17 to the test apparatus.

The backup board 7 is sized for the card 9 under test by adjusting the position of the angular rail elements 112 while the stud or studs 114 are threaded in a selected hole or holes 130 so as to support the card 9 at midspan points in areas free of the component parts 140. The platen-patch board assembly 1 is then installed in the contact fixture 3, with the slide rails 35 of the assembly 1 being guided by the slide blocks 52 of the fixture 3 and releasably locked by a suitable detent plunger, not shown, mounted therein. The door 62 is then closed and releasably latched by the latch 71 in the locking hole of the bracket 69, as shown schematically by FIG. 5.

The segmented card guide blocks 77 installed in the two cross slide members 75, as shown by FIGS. 1, 3 and 5, are positioned and locked by set screws 85 to a length appropriate to the longitudinal dimension of the platen 27. The cross slide members 75 are then positioned by the two lateral adjustment knobs 83 so as to clamp the platen 27 in the guide blocks 77. This automatically sizes the fixture for the lateral or width dimension of the card 9 to be placed under test and which is of a size corresponding to that of the platen 27.

The longitudinal guide member 93 is advanced to contact the platen 27 by the adjustment of the knob 97, and the tabs 87, as shown by FIG. 1, are then inserted and locked by set screws 89 in the guide blocks 77 to clamp the platen 27 longitudinally. Either two tabs 87 may be provided only at the points corresponding to the outer end surfaces of the card 9, or four tabs at points corresponding to the inner and outer end surfaces of the card 9 may be used dependent upon whether the card 9 to be placed under test permits the use of the centrally positioned longitudinal guide member 93. This automatically sizes the fixture for the longitudinal or length dimension of the card 9 under test.

The fixture is now programmed and sized for the printed circuit card 9 under test and is mounted in the receiver panel 5 and locked thereto by the manually operable lever arm 177, as heretofore explained. Electrical continuity is now made between the matrix of pressure pins 22 inserted in the platen 27 through the patch board plugs 18 and electrical connector prongs 19 to selected pins in the interface connectors 17 leading to a test apparatus of conventional type not shown. The fixture is then ready to receive the printed circuit card 9 for test.

The printed circuit card 9, as shown by FIGS. 1, 5 and 6, is placed on the spring biased pressure pin matrix 22 of the platen 27 and guided by the slide member 93, the card guide blocks 77 and the tabs 87 of FIG. 1. If the card 9 under test contains a connector 182 the plug 184 is connected thereto.

Thereafter, the backup board assembly 7 is placed over the card 9 under test and the toggle lever 102 may then be pulled forward, thereby causing, through the interconnecting linkage thereof and the spring 105, a biasing of the plunger 104 so as to press the backup board assembly 7 downwardly and thereby the card 9 into the matrix of spring biased pressure pins 22 on the platen 27, as shown by FIG. 1. This action causes the pressure pins 22 to effect electrical contact between the irregular surfaces of the selected nodes 10 on the card 9 under test and the pins of the interface connectors 17 leading to the test apparatus so that electrical fault isolation testing may then proceed.

Upon completion of the testing, the card 9 may be released from the fixture by actuating the lever 102 in a reverse backward direction, as shown by FIGS. 3 and 5, and removing the backup board assembly 7 and thereafter the printed circuit card 9.

In order to effectuate an electrical fault isolation test of a different type of printed circuit card, the fixture 3 is removed from the receiver panel 5 and the platen-patch board assembly 1 is removed from the fixture 3. The platen 27 may then be replaced by a different platen 27 or there may be utilized a platen-patch board assembly with such a different platen 27 formed with the holes 31 for mounting the pressure pins 22 in a pattern conforming to the node holes of the different type printed circuit card 9, as heretofore explained, whereupon the conditioning of the test fixture for the testing of the different type circuit card 9 may be repeated.

It will be seen from the foregoing that the printed circuit card contact test fixture of the present invention provides the following features:

(1) The provision of a versatile and adjustable fixture for mounting and locating different sizes and types of printed circuit cards and including means adjustable in a longitudinal or length dimension and in a lateral or width dimension through the use of the screw adjusted cross slide means 73, 75, 77, 79, 81 and 83 for lateral variance, with segmented card guide blocks 77 inserted therein and which blocks 77 include tabs 87 riding on rails thereon for one mode of longitudinal variance, and a centrally positioned screw adjusted longitudinal guide means 91, 93, 95, 97 and 99 for another mode of longitudinal variance.

(2) The above disclosed means of clamping the platen 27 serves to automatically size the fixture for the card 9 under test, since the platen 27 is cut to the same length and width dimensions as the card 9 and is formed with a pattern of holes 31 for mounting the pressure pins 22 which corresponds to the node holes of the specific card 9 to undergo test.

(3) A versatile fixture which provides a means of locating and guiding the card 9 under test, namely, by guiding the card 9 on the edges thereof by using the tabs 87 and card guide blocks 77 and 93, as heretofore described.

(4) The provision of an easily installed and removable interchangeable platen 27 in a platen-patch board assembly 1 which automatically sizes the fixture by the provision of adjustable means to guide and locate the card 9 under test and which utilizes a platen or master board 27 which is so formed as to correspond in size to the card 9. Furthermore, there is utilized the same equipment, template, or techniques to form the holes 31 in the platen 27 as that provided to initially produce the holes for the nodes 10 of the card 9. Thus such platen 27 of the test fixture may be readily programmed with the "poke home" pressure pins 22 in the mounting holes 31 and the interconnected patch cords 20 and patch board plugs 18 inserted in the patch board 14 provided in the test fixture in combination with the platen 27.

(5) There is further provided in the test fixture an adjustable backup board assembly 7 which supports the card 9 under test along its edges and at one or more selected midspan points through the use of adjustable rail elements 112 and a support plate 110 with slots therein and a grid of tapped holes 130 in the plate 110 for the selective insertion of a stud or studs 114 to prevent bowing of the card 9 under test. The elements of the backup board assembly 7 are furnished in several sizes to accommodate for tests of other cards 9 of different sizes within the size range of the fixture 3.

(6) Also, there is provided a readily adaptable fixture 3 which allows rapid changeover to different type printed circuit card testing with a minimal amount of new parts fabrication; namely, the fabrication of a platen or master board 27 and the programming of the platen-patch board assembly 1 and the adjustment of a variable size backup board assembly 7, as heretofore explained.

(7) Furthermore, there is provided a test device from which the platen-patch board assembly 1 may be removed in its entirety so that the particular pressure pin matrix and the program arrangement thereof might be stored for future use while a second platen-patch board assembly 1, programmed for a second printed circuit card, may be substituted in the test device for effecting tests on such second printed circuit card.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for a definition of the limits of the invention.

What we claim is:

1. A device for testing an electrical circuit card having nodes of electrical circuits positioned on a surface of the card in a predetermined pattern; said test device comprising a plurality of resilient contact probes, a platen-patch board assembly, means to releasably mount the platen-patch board assembly in said test device, the platen-patch board assembly including a platen for mounting the plurality of contact probes in the predetermined pattern of said nodes, means for mounting the card in spaced relation to the platen, means for adjusting the position of said mounting means in lateral and longitudinal senses relative to the platen to so mount the card relative to the platen as to cause the nodes of the card to correspond in position to the contact probes, means for biasing said card and thereby the nodes of the circuit card into electrical contacting relation with the resilient contact probes mounted by said platen in said position corresponding with said nodes, and said platen-patch board assembly including a patch board, and means selectively positioned in said patch board and individually connected to said contact probes for electrically connecting the contact probes and thereby the nodes and electrical circuits of the nodes to apparatus for conducting electrical tests on said electrical circuits.

2. The device defined by claim 1 in which the means selectively positioned in said patch board includes patch plugs individually connected to said resilient contact probes and selectively positioned in said patch board for connection to said electrical test conducting apparatus, means for mounting the platen in spaced relation to the patch board, the means to releasably mount the platen-patch board assembly in said test device includes means for slidably positioning the platen-patch board assembly in a releasable operative engagement in said test device, and means to selectively connect said patch plugs and thereby the contact probes, nodes and electrical circuits of the nodes to the apparatus for conducting the electrical tests on said electrical circuits.

3. The device defined by claim 1 including means for mounting the platen in spaced relation to the patch board, said resilient contact probes including spring biased electrical contact means projecting through the platen for making electrical contact with irregular surfaces of nodes of the electrical circuit card under test, and the means selectively positioned in said patch board including electrical plug means connected to the contact probes and selectively positioned in the patch board for operative connection to the apparatus for conducting electrical tests on said electrical circuits.

4. The device defined by claim 1 including means carried by the patch board for mounting the platen in spaced relation to the patch board, the resilient contact probes including a plurality of spring biased contact pins, said platen having mounting holes formed in a pattern corresponding to the pattern of the nodes of the electrical circuit card, means for carrying each of the spring biased contact pins, and the means for carrying each of the spring biased contact pins being positioned in said mounting holes for effecting electrical contact with the correspondingly positioned nodes of the electrical circuit card.

5. The device defined by claim 1 including means carried by the patch board for mounting the platen in spaced relation to the patch board, the resilient contact probes including a plurality of spring biased contact pins, said platen having mounting holes formed in a pattern corresponding to the pattern of the nodes of the electrical circuit card, means for carrying each of the spring biased contact pins, and the means for carrying each of the spring biased contact pins being positioned in said mounting holes, said carrying means including means for locking the carrying means in said mounting holes so as to render the spring biased contact pins effective to make electrical contact with the correspondingly positioned nodes of the electrical circuit card, and the means to releasably mount the platen-patch board assembly in said test device includes means for slidably mounting the patch board in releasable engagement in said test device with said platen being positioned into a releasable operative engagement with said means for mounting the platen and card in spaced relation.

6. The device defined by claim 1 in which the means for biasing said circuit card includes a backup board assembly comprising a support plate, angle rail elements mounted on the support plate and bearing along opposite edges of the electrical circuit card, pressure applying means carried by the support plate and bearing on the electrical circuit card intermediate the opposite edges of the circuit card, and an operator-operative clamping mechanism to bias the support plate into operative relation with the electrical circuit card so as to cause the pressure applying means to effectively bias the card so as to force the nodes of the electrical circuits of said circuit card into electrical contacting relation with the resilient contact probes.

7. The device defined by claim 1 in which the means for biasing said circuit card includes a backup board assembly comprising a support plate, angle rail elements, the support plate including means for adjustably positioning the angle rail elements on the support plate so as to bear along opposite edges of the electrical circuit card, a pressure stud, and the support plate including means for selectively positioning the pressure stud on the support plate so as to bear on the electrical circuit card in an area intermediate the opposite edges of the card and clear of obstructions on the card, and an operator-operative toggle clamping mechanism including a spring biased plunger means to bias the support plate into operative relation with the electrical circuit card so as to cause the pressure stud to effectively bias the card so as to force the nodes of the electrical circuits of said circuit card into electrical contacting relation with the reslient contact probes.

8. The device defined by claim 1 including means carried by the patch board for mounting the platen in spaced relation to the patch board, the resilient contact probes including a plurality of spring biased contact pins, said platen having mounting holes formed in a pattern corresponding to the pattern of the nodes of the electrical circuit card, means for carrying each of the spring biased contact pins, and the means for carrying each of the spring biased contact pins being positioned in said mounting holes, said carrying means including means for locking the carrying means in said mounting holes so as to render the spring biased contact pins effective to make electrical contact with the correspondingly positioned nodes of the electrical circuit card, and the means to releasably mount the platen-patch board assembly in said test device including means for slidably mounting the patch board in releasably engagement in said test device with said platen being positioned into a releasable operative engagement with said means for mounting the platen and card in spaced relation, and the means for biasing said circuit card including a backup board assembly comprising a support plate, angle rail elements, the support plate including means for adjustably positioning the angle rail elements on the support plate so as to bear along opposite edges of the electrical circuit card, a pressure stud, and the support plate including means for selectively positioning the pressure stud on the support plate so as to bear on the electrical circuit card in an area intermediate the opposite edges of the card and clear of obstructions on the card, and an operator-operative toggle clamping mechanism including a spring biased plunger means to bias the support plate into operative relation with the electrical circuit card so as to cause the pressure stud to effectively bias the card and thereby the nodes of the electrical circuits of said circuit card into the electrical contacting relation with the resilient contact probes in said position corresponding with said nodes.

9. A device for testing an electrical circuit card having nodes of electrical circuits positioned on a surface of the card in a predetermined pattern; said test device comprising a plurality of resilient contact probes, a platen for mounting the plurality of contact probes in the predetermined pattern of said nodes, means for mounting the card in spaced relation to the platen, means for adjusting the position of said mounting means in lateral and longitudinal senses relative to the platen to so mount the card relative to the platen as to cause the nodes of the card to correspond in position to the contact probes, means for biasing said card into an operative relation with said platen and thereby the nodes of the circuit card into electrical contacting relation with the resilient contact probes mounted by said platen, and means for electrically connecting the contact probes and thereby the nodes and electrical circuits of the nodes to apparatus for conducting electrical tests on said electrical circuits, a platen-patch board assembly including the platen and a patch board, patch plugs individually connected to said resilient contact probes and selectively positioned in said patch board for connection to said electrical test conducting apparatus, means for mounting the platen in spaced relation to the patch board, means for slidably positioning the platen-patch board assembly in a releasable operative engagement in said test device, means for receiving the patch board, operator-operative means for releasably locking the patch board in the receiving means, and means carried by the receiving means to selectively connect said patch plugs and thereby the contact probes, nodes and electrical circuits of the nodes to the apparatus for conducting the electrical tests on said electrical circuits upon the patch board being releasably locked in the receiving means by the operator-operative means.

10. The device defined by claim 9 in which the receiving means includes a box for receiving the patch board, and the means to selectively connect said patch plugs includes a plurality of electrical prongs carried by the box to selectively contact end portions of the patch plugs projecting through the patch board, the operator-operative means includes cam means mounted in the receiving box, the patch board includes a groove in an end portion thereof arranged in cooperative relation with the operator-operative cam means to releasably lock the patch board in the box with the electrical prongs connecting the patch plugs and thereby the contact probes, nodes and electrical circuits of the nodes to the apparatus for conducting the electrical tests on said electrical circuits.

11. The device defined by claim 9 in which the resilient contact probes include a plurality of spring biased contact pins, said platen having mounting holes formed in a pattern corresponding to the pattern of the nodes of the electrical circuit card, means for carrying each of the spring biased contact pins, and the means for carrying each of the spring biased contact pins being positioned in said mounting holes for effecting electrical contact with the correspondingly positioned nodes of the electrical circuit card.

12. The device defined by claim 9 in which the resilient contact probes include a plurality of spring biased contact pins, said platen having mounting holes formed in a pattern corresponding to the pattern of the nodes of the electrical circuit card, means for carrying each of the spring biased contact pins, and the means for carrying each of the spring biased contact pins being positioned in said mounting holes for effecting electrical contact with the correspondingly positioned nodes of the electrical circuit card, the means for biasing said card include a backup board assembly comprising a support plate, angle rail elements, the support plate including means for adjustably positioning the angle rail element on the support plate so as to bear along opposite edges of the electrical circuit card, a pressure stud, and the support plate including means for selectively positioning the pressure stud on the support plate so as to bear on the electrical circuit card in an area intermediate the opposite edges of the card and clear of obstructions on the card, and an operator-operative toggle clamping mechanism including a plunger to bias the support plate into operative relation with the electrical circuit card so as to cause the pressure stud to effectively bias the card so as to force the nodes of the electrical circuits of said circuit card into electrical contacting relation with the resilient contact probes.

13. The device defined by claim 9 including an operator-operative clamping mechanism, and a back board assembly including a support plate, angle rail elements mounted on the support plate and arranged to bear along opposite edges of the electrical circuit card, and pressure applying means carried by the support plate and bearing on the electrical circuit card intermediate the opposite edges of the circuit card, the support plate being adapted to be biased into operative relation with the electrical circuit card under a force selectively applied by the operator-operative clamping mechanism so as to cause the pressure applying means to effectively bias the card in a sense to force the nodes of the electrical circuits of said circuit card into contacting relation with the resilient contact probes.

14. The device defined by claim 13 in which the pressure applying means includes a pressure stud, and the support plate includes mounting holes for selectively receiving the pressure stud so as to adjustably mount the pressure stud in the support plate in a position to bear on the electrical circuit card in an area intermediate the opposite edges of the card and clear of obstructions on the card, the support plate being adapted to be biased into operative relation with the electrical circuit card under the force selectively applied by the operator-operative clamping mechanism so as to cause the pressure stud to effectively bias the card in a sense to force the nodes of the electrical circuits of said circuit card into contacting relation with the resilient contact probes.

15. The device defined by claim 13 in which the support plate includes means for adjustable positioning the angle rail elements on the support plate so as to bear along opposite edges of the electrical circuit card.

16. The device defined by claim 15 in which the pressure applying means includes a pressure stud, and the support plate includes mounting holes for selectively receiving the pressure stud so as to mount the pressure stud in the support plate in a position to bear on the electrical circuit card in an area intermediate the opposite edges of the card and clear of obstructions on the card, the support plate being adapted to be biased into operative relation with the electrical circuit card under the force selectively applied by the operator-operative clamping mechanism so as to cause the pressure stud to effectively bias the card in a sense to force the nodes of the electrical circuits of said circuit card into contacting relation with the resilient contact probes.

17. In a device for testing an electrical circuit card of a type having nodes of electrical circuits positioned on a surface of the card in a predetermined pattern, said testing device including a platen carrying resilient contact probes positioned in a predetermined pattern corresponding to the pattern of said nodes on the surface of the card, means for mounting the card in spaced relation to the platen, and an operator-operative clamping mechanism to effectively bias the card in a sense to force the nodes of the electrical circuits of said circuit cards into contacting relation with the resilient contact probes; the improvement comprising a unitary assembly, means to releasably mount the unitary assembly in said test device, said unitary assembly including the platen and a patch board, means for receiving the patch board in the test device, means carried by the patch board for mounting the platen in spaced relation thereto, patch plugs individually connected to said resilient contact probes and selectively positioned in said patch board, and means carried by the receiving means and selectively operable for electrically connecting the patch plugs and thereby the nodes of the electrical circuits to an apparatus for conducting electrical tests on said electrical circuits.

18. The improvement defined by claim 17 including operator-operative means for releasably locking the patch board in the receiving means, and the means selectively operable for electrically connecting the patch plugs including a plurality of electrical prongs carried by the receiving means to selectively connect said patch plugs and thereby the nodes of the electrical circuits to the apparatus for conducting the electrical tests on said electrical circuits upon the patch board being releasably locked in the receiving means by the operator-operative locking means.

19. The improvement defined by claim 17 in which the receiving means includes a box for receiving the patch board, a plurality of electrical prongs mounted in the box to selectively contact end portions of the patch plugs projecting through the patch board, operator-operative cam means mounted in the receiving box, the patch board having a groove in an end portion thereof arranged in cooperative relation with the operator-operative cam means to releasably lock the patch board in the receiving box with the electrical prongs selectively connecting the patch plugs and thereby the nodes of the electrical circuits to the apparatus for conducting the electrical tests on said electrical circuits.

20. The improvement defined by claim 17 in which the mounting means for the card includes means for adjustably positioning the card in a transverse relation to the contact probes carried by the platen so as to cause the nodes of the card to coincide in position to the contact probes.

21. The improvement defined by claim 20 in which the mounting means for the card includes cross slide members at opposite sides of the card, and means for laterally positioning the cross slide members in relation to the opposite sides of the cards for laterally adjusting the position of the card relative to the mounting means for the contact probes so as to cause the nodes of the card to coincide in position to the contact probes.

22. The improvement defined by claim 20 in which the mounting means for the card includes a longitudinal slide member at one end of the card, and means for longitudinally positioning the slide member in relation to said one end of the card for longitudinally adjusting the position of the card relative to the mounting means for the contact probes so as to cause the nodes of the card to coincide in position to the contact probes.

23. The improvement defined by claim 20 in which the mounting means for the card includes tabs slidably mounted on the mounting means for the card so as to engage at least one end of the card to limit linear adjustment of the position of the card relative to the mounting means for the contact probes so as to cause the nodes of the card to coincide in position to the contact probes.

24. The improvement defined by claim 20 in which the mounting means for the card includes cross slide members at opposite sides of the card, first means for laterally positioning the cross slide members in relation to the opposite sides of the card to laterally adjust the position of the card relative to the mounting means for the contact probes; a longitudinal slide member at one end of the card, second means for longitudinally positioning the longitudinal slide member in relation to said one end of the card to longitudinally adjust the position of the card relative to the mounting means for the contact probes; tabs slidably mounted on the cross slide members, means to releasably secure the tabs on the cross slide members so as to engage at least an opposite end of said card to limit linear adjustment of the position of the card in at least one sense relative to the mounting means for the contact probes; and said slide members and tabs being so positioned that the card may be effectively positioned relative to the mounting means for the contact probes so as to cause the nodes of the card to coincide in position to the contact probes.

25. A device for testing an electrical circuit card having nodes of electrical circuits positioned on a surface of the card in a predetermined arrangement; said test device comprising a plurality of resilient contact probes, means for mounting the plurality of contact probes in an arrangement corresponding to the predetermined arrangement of said nodes, means for mounting the card in spaced relation to the mounting means for the contact probes, and said mounting means for the card including cross slide members at opposite sides of the card, first means for laterally positioning the cross slide members in relation to the opposite sides of the card to laterally adjust the position of the card relative to the mounting means for the contact probes; a longitudinal slide member at one end of the card, second means for longitudinally positioning the longitudinal slide member in relation to said one end of the card to longitudinally adjust the position of the card relative to the mounting means for the contact probes; tabs slidably mounted on the cross slide members, means to realeasably secure the tabs on the cross slide members so as to engage at least an opposite end of said card to limit linear adjustment of the position of the card in at least one sense relative to the mounting means for the contact probes; said slide members and tabs being so positioned that the card may be effectively positioned relative to the mounting means for the contact probes so as to cause the nodes of the card to coincide in position to the contact probes, and means for biasing the card and thereby the nodes of said card into electrical contacting relation with the resilient contact probes in said position coinciding with said nodes.

26. The test device defined by claim 25 including an operator-operative toggle clamping mechanism including a plunger to selectively render the biasing means effective to bias the card in a sense transverse the lateral and longitudinal adjustments of the card effected by the first and second means and thereby bias the nodes of said card into the electrical contacting relation with the resilient contact probes in said position coinciding with said nodes.

References Cited
UNITED STATES PATENTS 2,918,648   12/1959   Ludman   324—73X
3,348,146   10/1967   Freund   324—158

RUDOLPH V. ROLINEC, Primary Examiner

E. F. KARLSEN, Assistant Examiner

U.S. Cl. X.R.

324—73